United States Patent [19]
Storc et al.

[11] Patent Number: 5,934,727
[45] Date of Patent: Aug. 10, 1999

[54] ADAPTABLE PICK UP TRUCK CONFIGURATION

[75] Inventors: Robert Gordon Storc, Rochester Hills; Leon F. Van Eden, Troy; Carl Wellborn, Detroit, all of Mich.

[73] Assignee: General Motors Corporation, Detroit, Mich.

[21] Appl. No.: 08/895,109

[22] Filed: Jul. 16, 1997

[51] Int. Cl.⁶ .................................................. B62D 25/00
[52] U.S. Cl. ...................... 296/26.11; 296/57.1; 296/37.6
[58] Field of Search .................. 296/26.8, 26.9, 296/26.1, 26.11, 57.1, 37.6, 39.2

[56] References Cited

U.S. PATENT DOCUMENTS

| | | |
|---|---|---|
| 2,184,814 | 12/1939 | Nagamatsu . |
| 2,534,626 | 12/1950 | Rubenstein . |
| 2,602,691 | 7/1952 | Doty . |
| 3,169,792 | 2/1965 | Viquez . |
| 3,240,527 | 3/1966 | Weiss et al. . |
| 3,291,520 | 12/1966 | Smith . |
| 3,729,224 | 4/1973 | Hathaway, Jr. . |
| 3,770,312 | 11/1973 | Shadburn . |
| 4,093,301 | 6/1978 | Kwok . |
| 4,458,939 | 7/1984 | Hohn . |
| 4,480,868 | 11/1984 | Koto . |
| 4,613,183 | 9/1986 | Kesling ..................................... 296/183 |
| 4,848,832 | 7/1989 | Starnes . |
| 4,941,702 | 7/1990 | Southward . |
| 4,944,612 | 7/1990 | Abstetar et al. ........................ 296/39.2 |
| 4,958,876 | 9/1990 | Diaco et al. ............................ 396/39.2 |
| 5,150,939 | 9/1992 | Simin . |
| 5,234,249 | 8/1993 | Dorrell ................................ 296/57.1 X |
| 5,240,301 | 8/1993 | Arnold . |
| 5,415,506 | 5/1995 | Payne . |
| 5,449,212 | 9/1995 | Seifert . |
| 5,524,951 | 6/1996 | Johnson . |
| 5,645,310 | 7/1997 | McLaughlin .......................... 296/180.5 |

FOREIGN PATENT DOCUMENTS 1092316  11/1960  Germany .

*Primary Examiner*—Joseph D. Pape
*Attorney, Agent, or Firm*—Kathryn A. Marra; Jeffrey A. Sedlar

[57] ABSTRACT

A pick up truck configuration is adaptable for carrying a cargo load longer than the cargo box and preferably at or above the wheel covers protruding into the cargo box. An adaptable pick up truck configuration includes a cab portion and a cargo box. A box panel portion is pivotally connected to a front wall of the cargo box and is movable to a generally horizontal position in which the box panel portion partially overlies and is supported by the wheel covers. The cargo box includes a cargo box opening when the box panel portion is in the generally horizontal position. A cab panel portion is pivotally mounted to the cab portion and is movable between a generally vertical closed condition and a generally horizontal open position. The cab portion has a cab opening when the cab panel portion is in the generally horizontal position and the cab opening is at least partially aligned with the cargo box opening. Thus, the pick up truck configuration is adaptable to carry the cargo load longer than the cargo box through both the cab portion and the cargo box and also advantageously can carry a wider load above the wheel covers.

9 Claims, 9 Drawing Sheets

ADAPTABLE PICK UP TRUCK CONFIGURATION

TECHNICAL FIELD

This invention relates to a pick up truck having an adaptable configuration which permits the carrying of longer and wider loads.

BACKGROUND OF THE INVENTION

It is well known in the prior art to provide a pick up truck having a cab portion for carrying passengers and a cargo box for carrying cargo. The cargo box typically includes wheel covers which decrease the available width of the cargo box at the lower portion of the box. It is also known in the prior art that wider loads may be carried in the cargo box by providing one or more planar members, such as boards, which assist in carrying a wider load above the wheel covers in the cargo box.

It is also known in the prior art to provide a hole or passage the cab portion and the cargo box portion for carrying a somewhat longer load on the floor of the truck. However, this arrangement has the shortcoming of not being able to accommodate wider loads. In addition, these configurations are not well-adapted for carrying passengers when not in use for carrying cargo. Other passages or openings have been provided between cab portions and cargo boxes, however, these configurations are concerned with the passing through or seating of passengers and are not suited for carrying longer and wider cargo loads.

As the popularity of trucks increases, it has become desirable to provide trucks that have rearward extended cab portions suitable for carrying more than three passengers. However, this reduces the load carrying capacity of the cargo boxes.

SUMMARY OF THE INVENTION

The present invention provides alternative and advantages over the prior art by providing an adaptable pick up truck configuration which allows for carrying longer and wider loads than the traditional pick up configurations. These arrangements are particularly useful for better versatility and utility of pick up trucks with expanded rear seat passenger compartments and shorter cargo boxes. Advantageously, this pick up truck can alternately be used for carrying both front and rear seat passengers while also being adaptable to carry longer and wider cargo loads. Also advantageously, the increased load carrying capabilities of the pick up truck do not interfere with the provision of a fully functional cab portion for carrying both front and rear seat passengers, preferably including a fully operational rear cab window. Advantageously, the pick up truck is easily adaptable for carrying passengers or for carrying longer and wider cargo loads. Also, the pick up truck can be used as a traditional pick up truck with full passenger capacity and traditional load carrying capacity when desired. Furthermore, the pick up truck configuration allows longer and wider loads to be carried in the vehicle which are securely supported along the entire length and width. Advantageously, the reconfiguration of the truck for expanded load carrying capacity is easily accomplished, preferably without the use of any tools. This arrangement also advantageously allows the use of a shorter cargo box for easier parking and maneuvering, while providing a truck for carrying more than three passengers or expanded cargo loads.

These advantages are accomplished by providing an adaptable pick up truck configuration including a cab portion and a cargo box. The cargo box includes a front wall adjacent the cab portion and a rear wall. The pick up truck configuration is adaptable for carrying a cargo load longer than the cargo box and at or above the wheel covers protruding into the cargo box. A box panel portion is pivotally connected to the front wall of the cargo box and is movable between a generally vertical position in which the front wall of the cargo box is closed and a generally horizontal position in which the box panel portion partially overlies and is supported by the wheel covers. The cargo box includes a cargo box opening when the box panel portion is in the generally horizontal position. A cab panel portion is pivotally mounted to the cab portion and is movable between a generally vertical closed condition and a generally horizontal open position. The cab portion has a cab opening when the cab panel portion is in the generally horizontal position and the cab opening is at least partially aligned with the cargo box opening. Thus, the pick up truck configuration is adaptable to carry the cargo load longer than the cargo box through both the cab portion and the cargo box and also advantageously can carry a wider load at or above the wheel covers.

Preferably, the rear wall of the cargo box includes a tailgate pivotally connected to the cargo box for movement between a generally upright closed position and a generally horizontal open position. The tailgate has an upper tailgate edge and the tailgate is movable to an intermediate position between the open and closed positions. The upper tailgate edge is vertically aligned with the box panel portion when the tailgate is in the intermediate position and when the box panel portion is in the generally horizontal position such that the pick up truck configuration is adaptable to carry the cargo load in a generally flat horizontal condition supported by the upper tailgate edge and the box panel portion when the cargo load extends rearward past the rear wall of the cargo box.

In one form of the invention, the cab panel portion has a lower cab panel edge about which the cab panel portion pivots open in a forward and downward direction and is supported by an upwardly facing seat back wall. In other forms of the invention, the cab panel portion has an upper cab panel edge about which the cab panel portion pivots rearward and upward to the generally horizontal position for providing the cab opening. Preferably in conjunction with this configuration, the seat is adapted to be folded forwardly and downwardly to provide an upwardly facing seat load surface which is generally vertically aligned with the box panel portion when the box panel portion is in the generally horizontal position such that the box panel portion and the seat load surface are adapted to cooperatively support the cargo load in a generally horizontal condition.

In conjunction with any of the configurations, the cargo box may also include opposing channels and a support member adapted to be slipped into the channels. The support member includes a top support edge and the top support edge is generally vertically aligned with the box panel portion when the box panel portion is in the generally horizontal position such that the box panel portion and the top support edge are adapted to cooperatively support the cargo load in a generally horizontal condition.

DESCRIPTION OF THE PREFERRED EMBODIMENT

Figure 1:
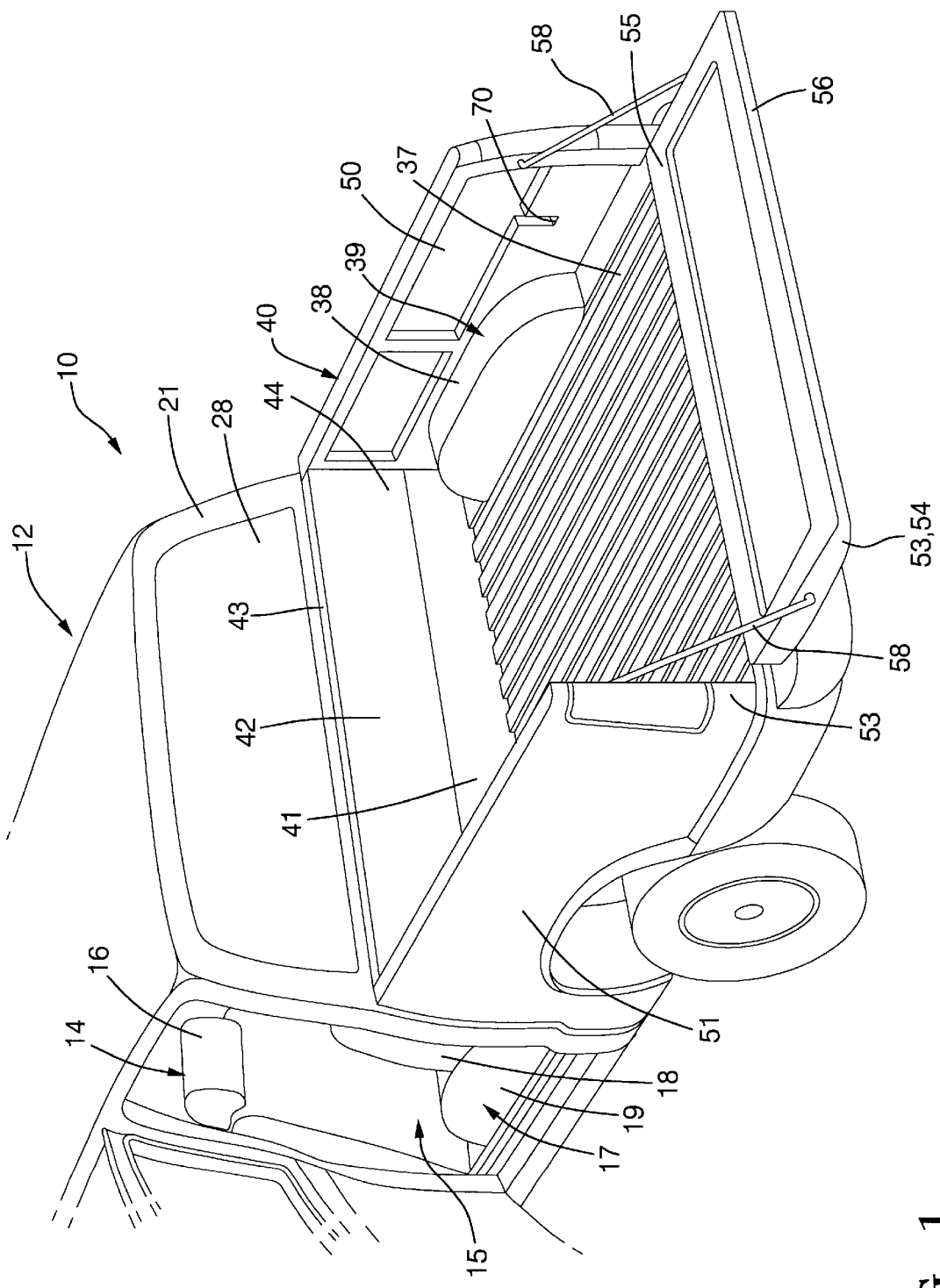
FIG. 1 is a perspective view of a pick up truck in a normal condition for carrying passengers in a cab portion with the tailgate in an open position for clarity of the cargo box view.
Figure 2:
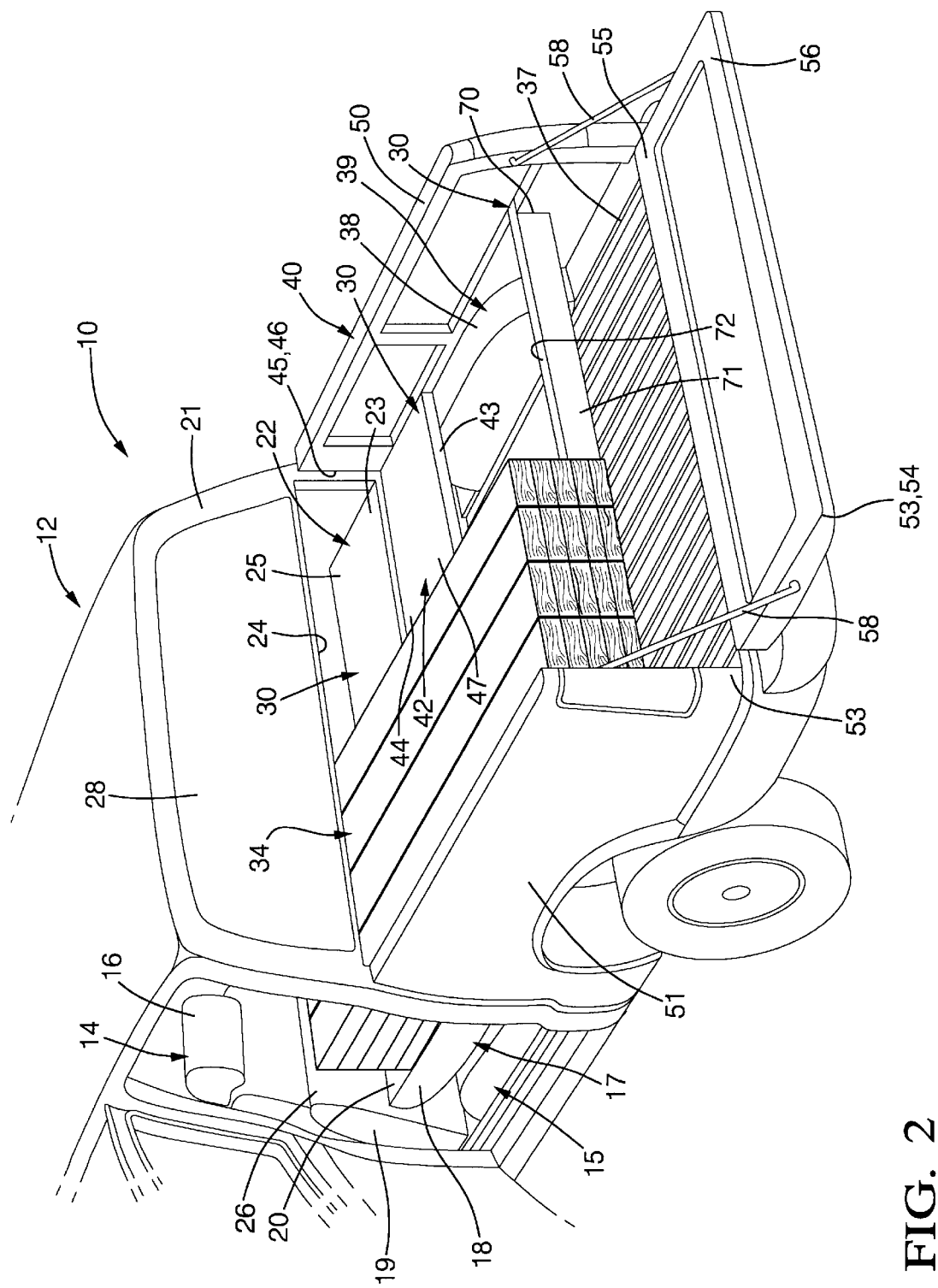
FIG. 2 is a view similar to FIG. 1, but showing the pick up truck reconfigured to an expanded load carrying condition.
Figure 3:
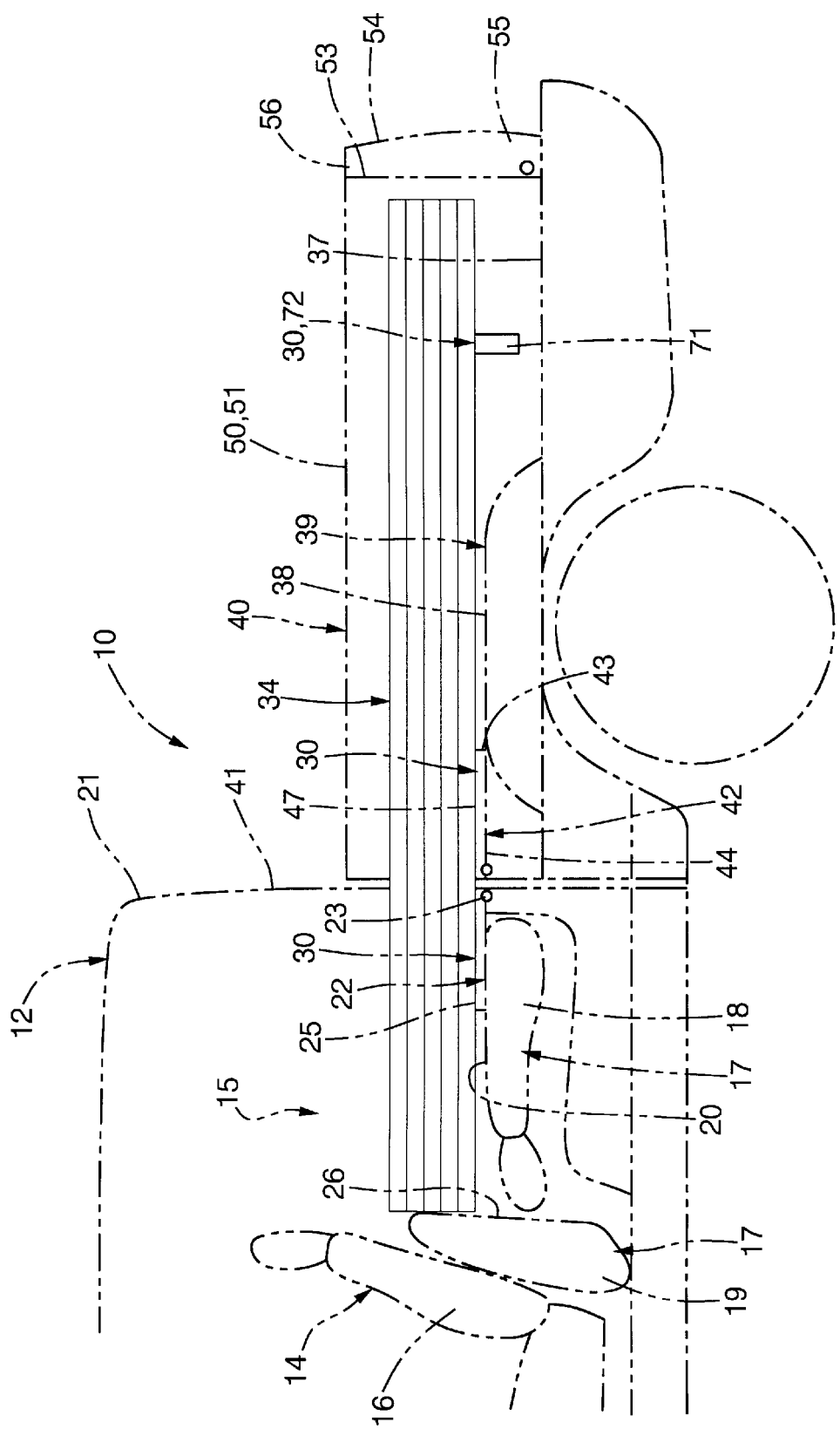
FIG. 3 is a side view of the pick up truck in the expanded load carrying condition with the pick up truck shown in phantom lines for clarity and with the tailgate in the closed condition.

Referring to FIGS. 1–3, a vehicle being a pick up truck 10 includes a cab portion 12 for normally carrying passengers (not shown) and a cargo box 40 for carrying various types of cargo loads 34, for example such as several boards shown in FIGS. 2 and 3 which may each have a length of six to ten feet. As best shown in FIG. 3, the truck 10 includes a front passenger seating arrangement 14 having one or more front seats 16 for seating one to three passengers. As is becoming increasingly popular, the truck 10 also includes a rear extended cab portion 15 which preferably includes one or more rear seats 17 for seating an additional one to three passengers. The truck 10 includes features making it easily adaptable for carrying longer and wider loads without lengthening the cargo box 40 for ease of parking and maneuvering, while also permitting the increased passenger capacity, as described further hereinafter.

The cargo box 40 generally includes four sides comprising a front wall 41, first and second side walls 50, 51 and a rear wall 53 mainly provided by a tailgate 54. The tailgate 54 is pivotally mounted at a lower tailgate edge 55 adjacent to the side walls 50, 51 for movement between a fully open condition shown in FIGS. 1 and 2 and a closed condition shown in FIG. 3. The tailgate 54 also includes an upper tailgate edge 56. The cargo box 40 includes a lower floor portion 37 extending between the walls 41, 50, 51, and 53. The cargo box 40 further includes upwardly extending wheel covers 39 which protrude into the cargo box 40 and decrease the width of the cargo box 40 at the floor portion 37, thus limiting the width of loads which can be carried at the floor level between the wheel covers 39. The wheel covers 39 each include upper surfaces 38 which assist in supporting the cargo loads 34, as described further hereinafter.

As shown in FIG. 1, the cargo box 40 preferably also includes one or more pairs of vertically extending channels 70. A pair of opposing channels 70 are preferably positioned between the wheel covers 39 and the tailgate 54. The channels 70 may be integrally formed with the sheet metal of the cargo box 40 or may be provided as part of a bedliner (not shown) disposed on the cargo box 40. As best shown in FIGS. 2 and 3, a vertically oriented, generally planar support member 71, such as a wooden board, is slidably inserted within the channels 70 and has a height such that a top support edge 72 of the support member 71 is preferably generally vertically aligned slightly above the upper surfaces 38 of the wheel covers 39. Thus, the support member 71 can also be used to support the cargo load 34 for second tier loading above the wheel covers 39. With this arrangement, the cargo load 34 can be loaded above the wheel covers 39 such that the entire width of the cargo box 40 can be utilized.

However, the cargo load 34 may have a length which exceeds a length of the cargo box 40, especially when the truck 10 includes a shorter cargo box 40 with the rear extended cab portion 15 for additional passenger seating. Advantageously, to accommodate longer loads, the front wall 41 of the cargo box 40 further includes a box panel portion 42 which is pivotally mounted at a lower box panel edge 44 to the surrounding stationary portion of the front wall 41. The box panel portion 42 is spaced above the floor portion 37 of the cargo box 44 and has an upper edge 43 generally even with the upper edges of the cargo box 40. The box panel portion 42 pivots between a vertically oriented closed condition shown in FIG. 1 to close the front wall 41 of the cargo box 40 when the truck 10 is in a normal condition. The box panel portion 42 is pivotable to a generally horizontally oriented open condition shown in FIGS. 2 and 3 to provide a cargo box opening 45 on the front wall 41. Preferably, the upper box panel edge 43 of the box panel portion 42 rests on the upper surfaces 38 of the wheel covers 39 when in the open condition and thus provides a first load surface 47 which is just slightly above the wheel covers 39. Alternately, it will be appreciated that the upper box panel edge 43 could also rest on the more forward, slightly inclined portion of the wheel covers 39 such that the first load surface 47 is directly aligned with the upper surfaces 38 of the wheel covers 39. In this case, the load could also be directly rest on and be supported by the upper surfaces 38 of the wheel covers 39.

The box panel portion 42 preferably has sufficient length such that the box panel portion 42 partially engages and is supported on the wheel covers 39 when the box panel portion 42 is in the generally horizontal open condition. Preferably, the box panel portion 42 extends substantially across the width of the front wall 41 of the cargo box 40 for providing the maximum size cargo box opening 45 for allowing the widest possible cargo loads 34 to be carried which can extend across substantially the entire width of the cargo box 40 at the upper second tier location spaced above the floor portion 37 and the wheel covers 39. Thus, the cargo box opening 45 has opening side edges 46 which are preferably aligned with the side edges 50, 51 of the cargo box 40.

The cab portion 12 is primarily used for carrying passengers when the truck 10 is in the normal condition as shown in FIG. 1. As best shown in FIG. 3, the rear seat 17 in the rear extended cab portion 15 preferably includes a seat back portion 18 and a bottom seat cushion 19. The seat back portion 18 includes a seat back wall 20 which is used to support the load 34, as described further hereinafter.

The cab portion 12 also includes a rearward cab wall 21 located behind the rear seats 17. Advantageously, to enable accommodation of longer and wider cargo loads, the cab wall 21 includes a cab panel portion 22 which is pivotally mounted at a lower cab panel edge 23 to a stationary portion of the rearward cab wall 21. The cab panel portion 22 pivots between a vertically oriented closed condition shown in FIG. 1 to close the rearward cab wall 21 of the cab portion 12 when the truck 10 is in a normal condition. The cab panel portion 22 is pivotable to a horizontally oriented open condition shown in FIGS. 2 and 3 to provide a cab opening 24 on the rearward cab wall 21. In the open condition, the cab panel portion 22 rests on and is supported by the seat back wall 20. The cab opening 24 is preferably aligned with the cargo box opening 45 on the front wall 41. In addition, the open cab panel portion 22 preferably provides a horizontal second load surface 25 which is vertically aligned with the first load surface 47 of the cargo panel portion 42 when both are in the open condition. Preferably, the cab panel portion 22 is also generally vertically aligned with the top support edge 72 of the support member 71 when in the open condition and is also aligned at or slightly above the upper surfaces 38 of the wheel covers 39.

The cab panel portion 22 preferably has a length such that the cab panel portion 22 at least partially engages and is supported on the seat back wall 20 of the seat back portion 18 of the rear seat 17 when the cab panel portion 22 is in the generally horizontal open condition. Preferably, the cab panel portion 22 extends substantially across the width of the rearward cab wall 21 of the cab portion 12 for providing the maximum width cab opening 24 for allowing the widest possible cargo loads 34 to be carried which can extend across substantially the entire width of the cab portion 12 at the upper second tier location spaced at or above the wheel covers 39. Thus, the cab opening 24 has upper, lower, and side edges which are preferably aligned with the upper, lower and side edges of the cargo box opening 45.

As best shown in FIGS. 2 and 3, the seat cushion 19 is moveable to a forward generally vertical condition behind the front seat 16 to provide a stop surface 26 for restraining the load 34 against moving forward towards the front seat 16. It will also be appreciated that additional stop surfaces could also be provided in a similar location which may extend the stop surface 26 in a further upward direction when higher loads 34 are carried.

As best shown in FIG. 3, a longer and wider load can be advantageously be carried by the pick up truck 10 when configured to the expanded load carrying condition. To achieve the expanded load carrying condition, the box panel portion 42 is folded down in a rearward direction until it rests on the upper surfaces 38 of the wheel covers 39 to provide the cargo box opening 45. The seat cushion 19 is flipped upward until the stop surface 26 faces generally rearward and the seat back portion 18 is folded downward and forward such that the seat back wall 20 is facing upward. The cab panel portion 22 is then folded downward and forward until it rests on the seat back wall 20 and provides the cab opening 24. The upwardly facing cab panel portion 22 provides the second load surface 25. The support member 71 is vertically slipped into the channels 70. In this expanded load carrying condition, the truck 10 includes an upper second tier platform 30 formed by the first and second load surfaces 47, 25 and the top support edge 72 of the support members 71. This intermittent platform 30 located above the wheel covers 39 and within the cab portion 12 advantageously enables both a wider load and a longer load 34 to be carried. Also advantageously, this expanded load carrying configuration can be easily and quickly achieved by the user of the truck 10 without the use of tools.

It will be appreciated that the load 34 is cooperatively supported along its length and width by the second load surface 25 of the cab panel portion 22 which is supported by the seat back wall 20, by the first load surface 47 of the box panel portion 42 which is supported by the upper surfaces 38 of the wheel covers 39, and by the top support edge 72 of the support member 71, all of which are generally vertically aligned with each other to cooperatively provide the intermittent second tier platform 30 for carrying a longer and wider load 34 than possible with the cargo box 40 only. It will further be appreciated that the load 34 may extend across the entire width of the platform 30, but is shown as only extending partially across the width for clarity in FIG. 2. Advantageously, it will be appreciated that a longer load 34 is able to carried in a generally flat, horizontal condition with the tailgate 54 closed to hold the load in place during acceleration of the truck 10.

Advantageously, the cab opening 24 and cargo box opening 45 are both located below a rear window 28 of the cab portion 12 such that a standard, traditional window 28 may be used without modification. Also advantageously, existing trucks 10 can be modified to provide the expanded load carrying capabilities.

It will be understood that a person skilled in the art may make modifications to the preferred embodiment shown herein within the scope and intent of the claims. For example, although the preferred embodiment shows only one support member 71, it will be appreciated that additional support members 71 with corresponding channels 70 may be included intermittently along the length of the cargo box 40. It will further be appreciated, that although the box panel portion 42 is preferably shown as being supported on the upper edges 38 of the wheel covers 39, it will be appreciated that the box panel portion 42 could alternately or additionally be supported on a support member 71 located between the wheel covers 39 and the front wall 41 of the cargo box 40. It will also be appreciated that the rear seat 17 including the seat back portion 18 and the seat cushion 19 can be a single seat extending substantially the width of the cab portion 12 or could be comprised of one or more seats which generally extend across the width of the cab portion 12. For example, one portion of the rear seat 17 could be folded for load carrying usage and the other portion could still be upright for passenger seating. Furthermore, the rear seat 17 may have varied configurations and the seat back wall 20 could alternately be cooperatively formed by the seat back portion 18 and the seat cushion 19 or the cab panel portion 22 could alternately be supported by a folded down portion of part of the front seat 16. It will also be appreciated that although the box panel portion 42 is preferably supported by the wheel covers 39, the box panel portion 42 in the horizontal condition could alternately be supported by a support member 71 located between the wheel covers 39 and the front wall 41.

Figure 4:
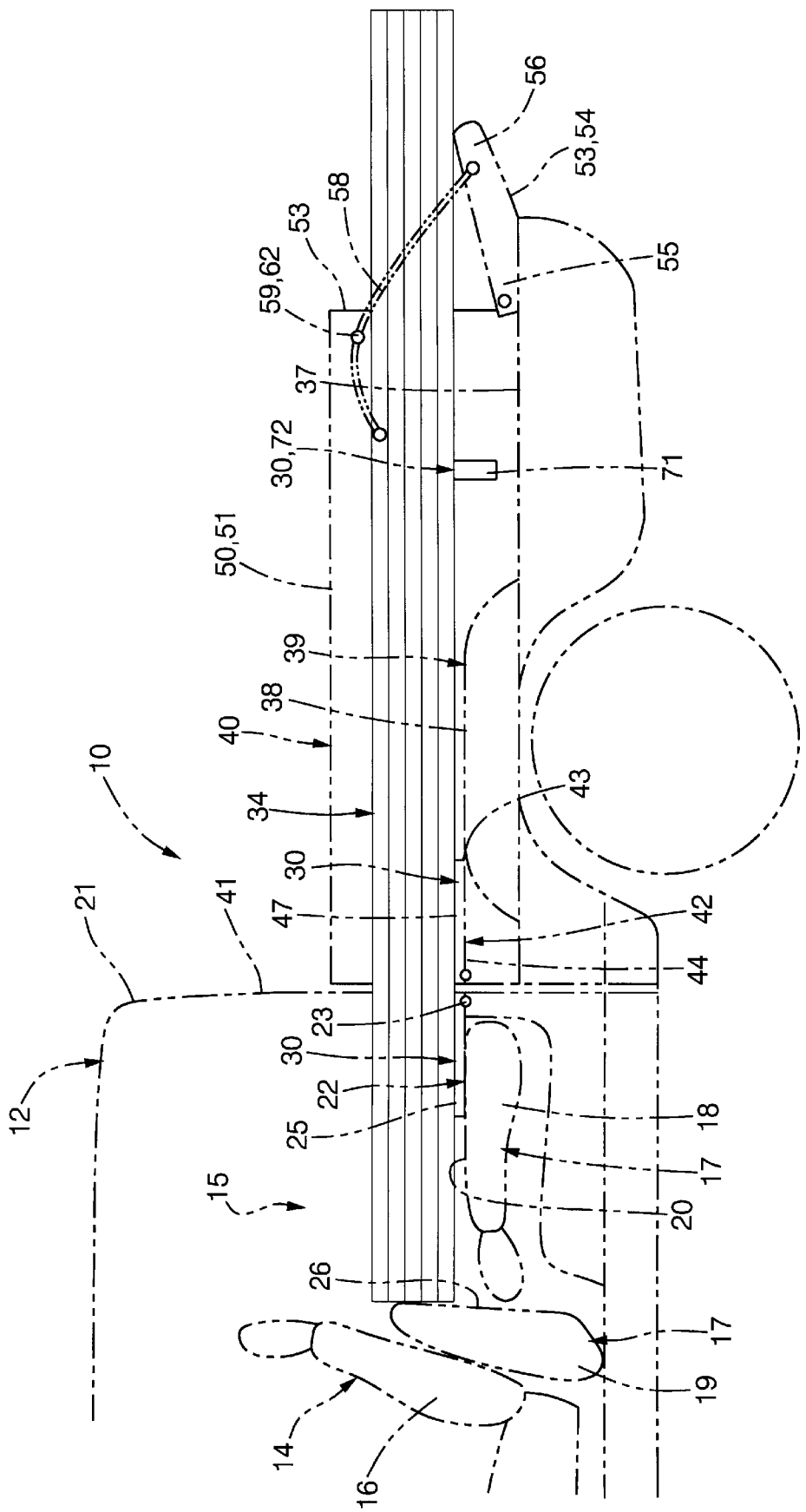
FIG. 4 is an alternate embodiment similar to the embodiment of FIGS. 1–3, but showing the tailgate in an intermediate position for carrying even longer loads in the expanded load carrying condition.

FIG. 4 includes an alternate embodiment of the invention which enables even longer loads 34' to be carried. Similar components having a similar description to those in FIGS. 1–3 are designated by similar numerals followed by a prime.

The embodiment of FIG. 4 operates in an identical manner to the embodiment of FIGS. 1–3, but has the additional feature of the tailgate 54' having an intermediate position in which the upper tailgate edge 56' also supports the load 34' such that the load 34' can extend rearward of the cargo box 40' as well as forward of the cargo box 40' into the cab portion 12'. To accomplish this additional load carrying length, the tailgate 54' is simply folded downward and rearward to an intermediate position shown in FIG. 4 and is held in place by adjustable side straps 58' having intermediate links 59' or loops which can be attached to mating attachment features 62' such as knobs located on the side edges 50', 51' of the cargo box 40' to hold the tailgate 54' in the intermediate position. It will be appreciated that the upper tailgate edge 56' is vertically aligned with the cab panel portion 22', the box panel portion 42', and the top support edge 72' of the support member 71' to provide an additional intermittent support surface to the platform 30' for carrying even longer loads 34' at the second tier above the wheel covers 39' for maximum cargo load width and length capacity.

It will further be appreciated that any means of holding the tailgate 54' in the intermediate position may be utilized and is not limited to the straps 58' shown in FIG. 4. For example, the tailgate 54' could be held in the intermediate position by straps having numerous additional links, by cables having adjustable keyhole fittings, by chains with adjustable links that snap onto a mating feature on the cargo box 40', or by other adjustable rack and pinion or winching devices which can adjust the tailgate 54' to numerous desired partially open positions, including the intermediate position.

Figure 5:
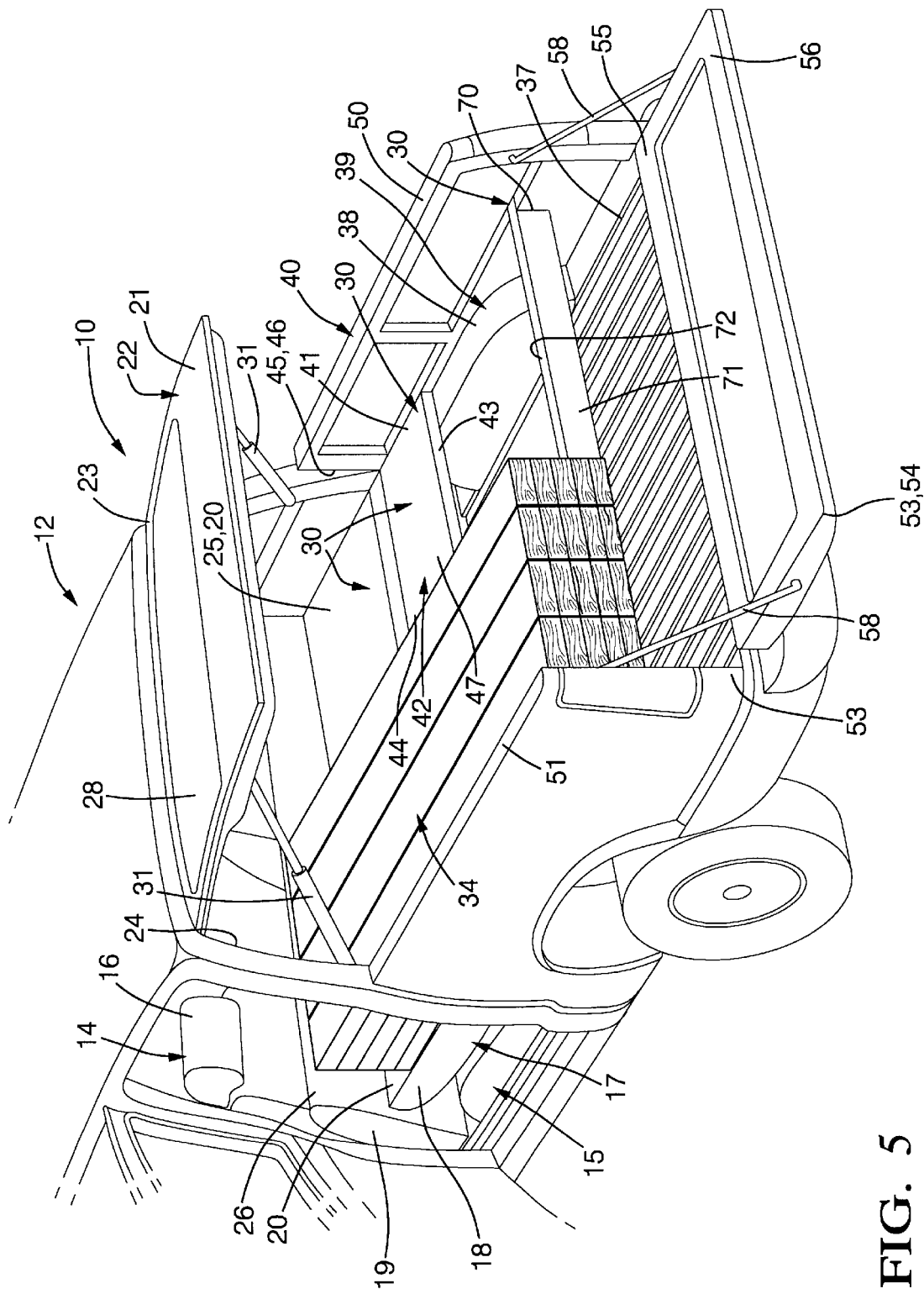
FIG. 5 is a perspective view showing another alternate embodiment of the pick up truck in an expanded load carrying condition with a cab panel portion in an open condition and with the tailgate in an open condition for clarity.
Figure 6:
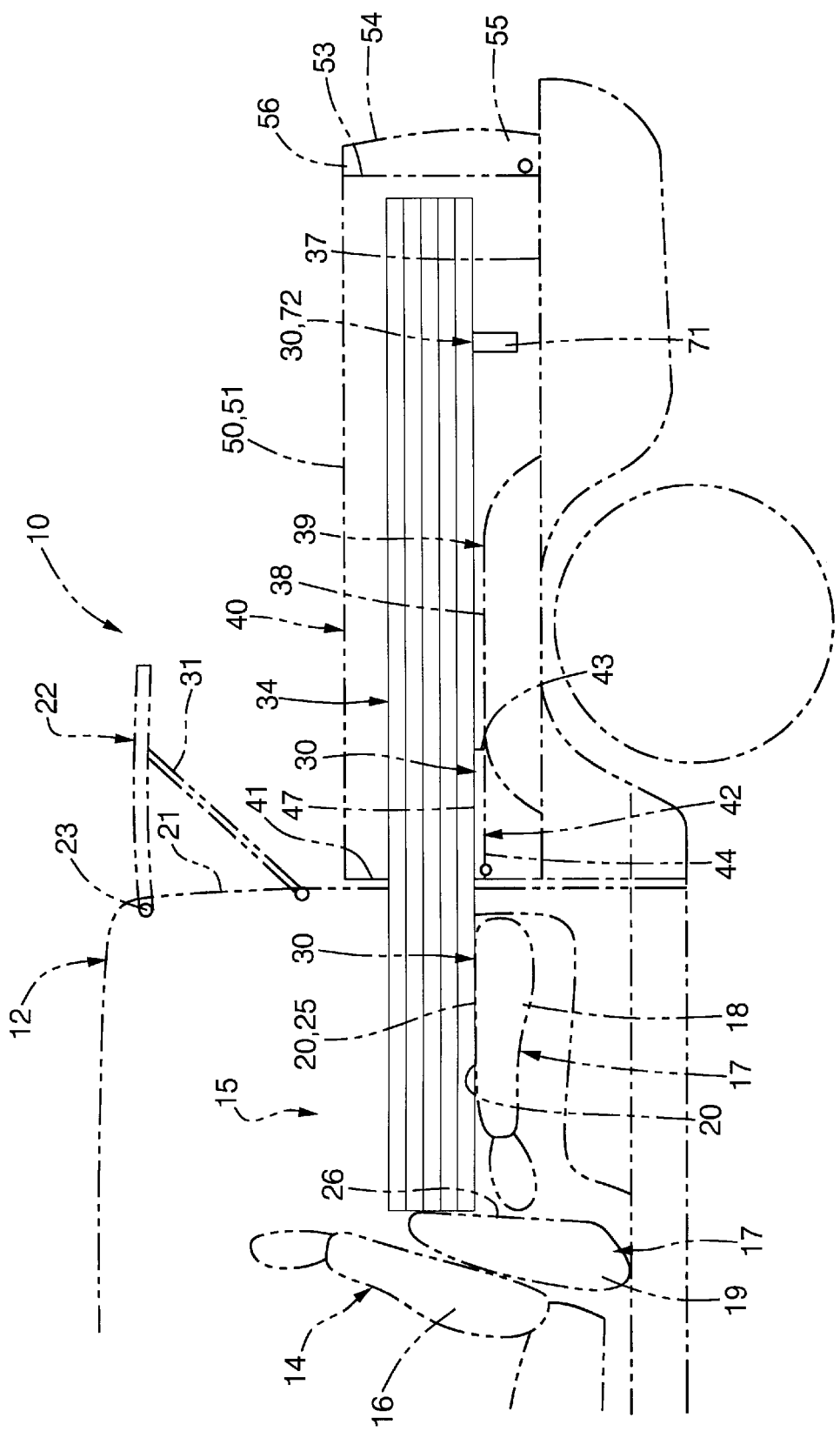
FIG. 6 is a side view of the embodiment of FIG. 5 and showing the pick up truck in phantom for clarity and showing the tailgate in the closed condition.

FIGS. 5 and 6 show another alternate embodiment of the invention in which features similar to those in the embodiment of FIGS. 1–3 are designated by similar numeral plus 100. Referring to FIGS. 5 and 6, a vehicle being a pick up truck 110 includes a cab portion 12 for normally carrying passengers (not shown) and a cargo box 140 for carrying various types of cargo loads 134, for example such as several boards shown in FIGS. 5 and 6. As best shown in FIG. 6, the truck 110 includes a front passenger seating arrangement 114 having one or more front seats 116 for seating one to three passengers. The truck 110 also includes a rear extended cab portion 115 which preferably includes one or more rear seats 117.

The cargo box 140 generally includes four sides comprising a front wall 141, first and second side walls 150, 151 and a rear wall 153 mainly provided by a tailgate 154. The tailgate 154 is pivotally mounted at a lower tailgate edge 155 adjacent to the side walls 150, 151 for movement between a fully open condition shown in FIG. 5 and a closed condition shown in FIG. 6. The tailgate 154 also includes an upper tailgate edge 156. The cargo box 140 includes a lower floor portion 137 extending between the walls 141, 150, 151, and 153. The cargo box 140 further includes upwardly extending wheel covers 139 which protrude into the cargo box 140 and decrease the width of the cargo box 140 at the floor portion 137, thus limiting the width of cargo load which can be carried at the floor level between the wheel covers 139. The wheel covers 139 each include upper surfaces 138 which can be used for helping to support the cargo load 134, as described further hereinafter.

As best shown in FIG. 5, the cargo box 140 preferably also includes one or more pairs of vertically extending channels 170. A pair of the channels 170 are preferably positioned between the wheel covers 139 and the tailgate 154. The channels 170 may be integrally formed with the sheet metal of the cargo box 140 or may be provided as part of a bedliner (not shown) disposed on the cargo box 140. As best shown in FIGS. 5 and 6, a vertically oriented, generally planar support member 171, such as a wooden board, is slidably inserted within the channels 170 and has a height such that a top support edge 172 of the support member 171 is generally vertically aligned just above the upper surfaces 138 of the wheel covers 139. Thus, the support member 171 is also used to assist in carrying the cargo load 134 for second tier loading above the wheel covers. With this arrangement, the cargo load 134 can be loaded above the wheel covers 139 such that the entire width of the cargo box 140 can be utilized.

However, the cargo load 134 may have a length which exceeds the length of the cargo box 140, especially when the truck 110 includes a shorter cargo box 140 with the rear extended cab portion 115 for additional passenger seating. Advantageously, to accommodate longer loads, the front wall 141 of the cargo box 140 further includes a box panel portion 142 which is pivotally mounted at a lower box panel edge 144 to a stationary portion of the front wall 141. The box panel portion 142 pivots to a vertically oriented closed condition to close the front wall 141 of the cargo box 140 when the truck 110 is in a normal condition. The box panel portion 142 is also pivotable to a horizontally oriented open condition to provide a cargo box opening 145 on the front wall 141. Preferably, an upper box panel edge 143 of the box panel portion 142 rests on the wheel covers 139 and is generally vertically aligned at or just above the upper surfaces 138 of the wheel covers 139 when in the open condition. The box panel portion 142 preferably has sufficient length such that the box panel portion 142 at least partially engages and is supported on the upper surfaces 138 of the wheel covers 139 when the box panel portion 142 is in the generally horizontal open condition. In the open condition, the box panel portion 42 provides a first load surface 147 for carrying the load 134. Preferably, the box panel portion 142 extends substantially across the width of the front wall 141 of the cargo box 140 for providing the maximum width cargo box opening 145 for allowing the widest possible cargo load 134 to be carried which can extend across substantially the entire width of the cargo box 140 at the upper second tier location spaced above the floor portion 137. Thus, the cargo box opening 145 has opening side edges 146 which are preferably aligned with the side edges 150, 151 of the cargo box 140.

The cab portion 112 is primarily used for carrying passengers when the truck 10 is in the normal condition. As best shown in FIG. 6, the rear seat 117 in the rear extended cab portion 115 preferably includes a seat back portion 118 and a bottom seat cushion 119. The seat back portion 118 includes a seat back wall 120 which is used to support the cargo load 134, as described further hereinafter.

The cab portion 112 also includes a rearward cab wall 121 located behind the rear seats 117. Advantageously, to enable accommodation of longer cargo loads, the rearward cab wall 121 includes a cab panel portion 122 which is pivotally mounted at an upper cab panel edge 123 to a stationary portion of the rearward cab wall 121. The cab panel portion 122 encompasses a substantial portion of the upper and middle part of the rearward cab wall 121, preferably including the entire rear window 128. The cab panel portion 122 pivots between a vertically oriented closed condition to close the rearward cab wall 121 of the cab portion 112 when the truck 110 is in a normal condition. Side struts 31 may be used to assist with ease of opening and closing the cab panel portion 122. In addition, the side struts 31 are preferably sufficiently strong and adjustable for holding the cab panel portion 122 in a partially open condition while carrying the cargo load 134. It will be appreciated that in this embodiment, the cab panel portion 122 is essentially provided as an upwardly and rearwardly pivoting hatch door.

The cab panel portion 122 is pivotable upward and rearward to a generally horizontally oriented open condition shown in FIGS. 5 and 6 to provide a cab opening 124 on the rearward cab wall 121. The cab opening 124 is preferably generally aligned with the cargo box opening 145 on the front wall 141 of the cargo box 140. Preferably, the cab panel portion 122 extends substantially across the width of the rearward cab wall 121 of the cab portion 112 for providing the maximum width cab opening 124 for allowing the widest possible cargo load 134 to be carried for extending across substantially the entire width of the cab portion 112 at the upper second tier location spaced above the floor portion 137 and at or above the wheel covers 139. Thus, the cab opening 112 has lower and side edges which are preferably aligned with the lower and side edges of the cargo box opening 145 and has a lower edge which is preferably aligned with the top support edge 72 of the support member 171 and the first load surface 47.

As shown in FIG. 5 and 6, the seat cushion 119 is moveable to a forward generally vertical condition behind the front seat 116 to provide a stop surface 126 for restraining the load 134 against moving forward toward the front seat 116. It will also be appreciated that other separate stop surfaces could also be provided in a similar location which may extend the stop surface 126 in a further upward direction when taller loads 134 are carried. Preferably, seat back wall 120 of the rear seat 117 can be folded downward and forward to provide a second load surface 125 which is generally vertically aligned with the first load surface 147 of the cab panel portion 122 and the top support edge 172 of the support member 171. The seat back wall 120 directly provides the second load surface 125 upon which the cargo load 134 can be directly supported in the cab portion 112. Furthermore, it will be appreciated that the rear seat 117 may have varied configurations and the seat back wall 120 providing the second load surface 125 could alternately be cooperatively formed by the seat back portion 18 and the seat cushion 19 could alternately be formed a folded down portion of part of the front seat 16.

Advantageously, longer and wider loads can be carried by the pick up truck 110 when configured to the expanded load carrying condition. To achieve the expanded load carrying condition, the box panel portion 142 is folded downward and rearward until it rests on the upper surfaces 138 of the wheel cover 139 to provide the cargo box opening 145. The seat cushion 119 is flipped upward until the stop surface 126 faces generally rearward. The seat back portion 118 is folded down and forward such that the seat back wall 120 is facing upwardly. The cab panel portion 122 is folded upward and rearward to provide the cab opening 24 through which the cargo load 134 can be inserted into the cab portion 112. The support member 171 is vertically slipped into the channels 710. In this expanded load carrying condition, the truck 110 includes an upper second tier platform 130 formed by the first and second load surfaces 147, 125 and the top support edge 172 of the support member 171. This intermittent platform 130 located above the wheel covers 139 and within the cab portion 112 advantageously enables both a wider load and a longer load 134 to be carried. Also advantageously, this expanded load carrying configuration can be easily and quickly achieved by the user of the truck 110 without the use of tools.

It will be appreciated that the load 134 is cooperatively supported along its length and width by the second load surface 125 of the seat back wall 120, by the first load surface 147 of the box panel portion 142 which is supported by the upper surfaces 138 of the wheel covers 139 and by the top support edge 172 of the support member 171, all of which are generally vertically aligned with each other to cooperatively provide the intermittent second tier platform 130 for carrying a longer and wider load 134 than possible with the cargo box 140 alone. It will further be appreciated that the load 134 may extend across the entire width of the platform 130, but is shown as only extending partially across the width for clarity in FIG. 5. Advantageously, it will be appreciated that a longer load 134 is able to carried in a generally flat, horizontal condition with the tailgate 154 closed to hold the load in place during acceleration of the truck 110.

Advantageously, the rear window 128 is entirely included with the cab panel portion 122 of the cab portion 112 such that a standard, traditional window may be used without modification. Also advantageously, existing trucks 110 can be modified to provide the expanded load carrying capabilities.

Figure 7:
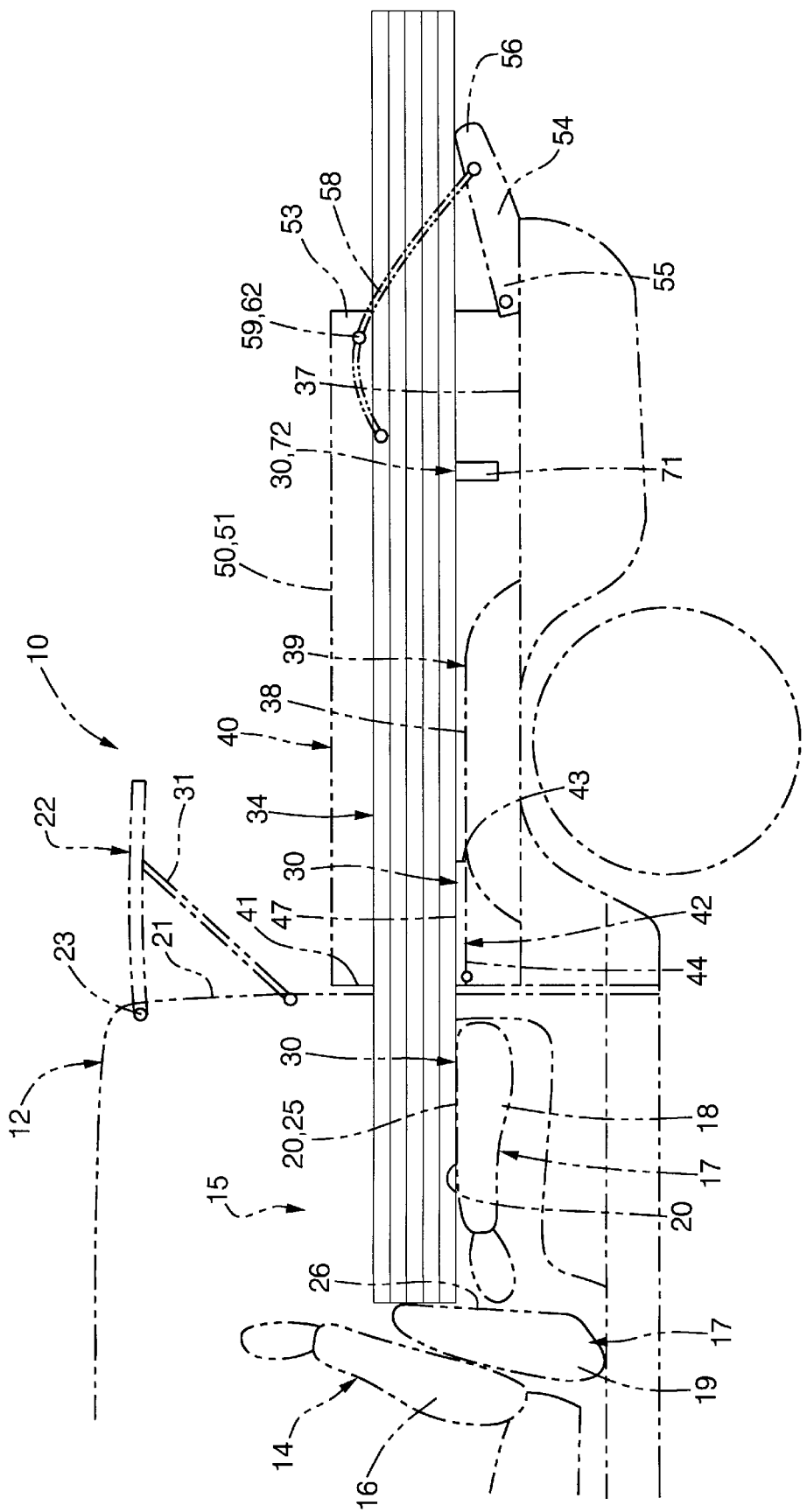
FIG. 7 is still another alternate embodiment similar to the embodiment of FIGS. 5 and 6, but showing the tailgate in an intermediate position for carrying even longer loads in the expanded load carrying condition.

FIG. 7 includes yet another alternate embodiment of the invention which enables even longer loads 134' to be carried. Similar components having a description similar to those in FIG. 5 and 6 are designated by similar numerals followed by a prime. The embodiment of FIG. 7 operates in an identical manner to the embodiment of FIGS. 5 and 6, but has the additional feature of the tailgate 154' having an intermediate position in which an upper tailgate edge 156' also supports the load 134' such that the load 134' can extend rearward of the cargo box 140' as well as forward of the cargo box 140' into the cab portion 112'. To accomplish this additional load carrying length, the tailgate 154' is simply folded downward and rearward to the intermediate position which is held in place by adjustable side straps 158' having intermediate links 159' or loops which can be manually attached to mating attachment features 162' such as knobs on the side edges 150', 151' of the cargo box 140' to hold the tailgate 154' in the intermediate position. In the intermediate position, the upper tailgate edge 156' is vertically aligned with the second load surface 125' on the seat back wall 120', the first load surface 147' on the box panel portion 142', and the top support edge 172' of the support member 171' to provide an additional intermittent support to the platform 130' for carrying even longer loads 134' at the second tier above the wheel covers 139' for maximizing the cargo load width and length capacity of the truck 110.

Similar to the embodiment of FIG. 3, it will further be appreciated that any means of holding the tailgate 154' in the intermediate position may be utilized and is not limited to the straps 158' shown in FIG. 7.

Figure 8:
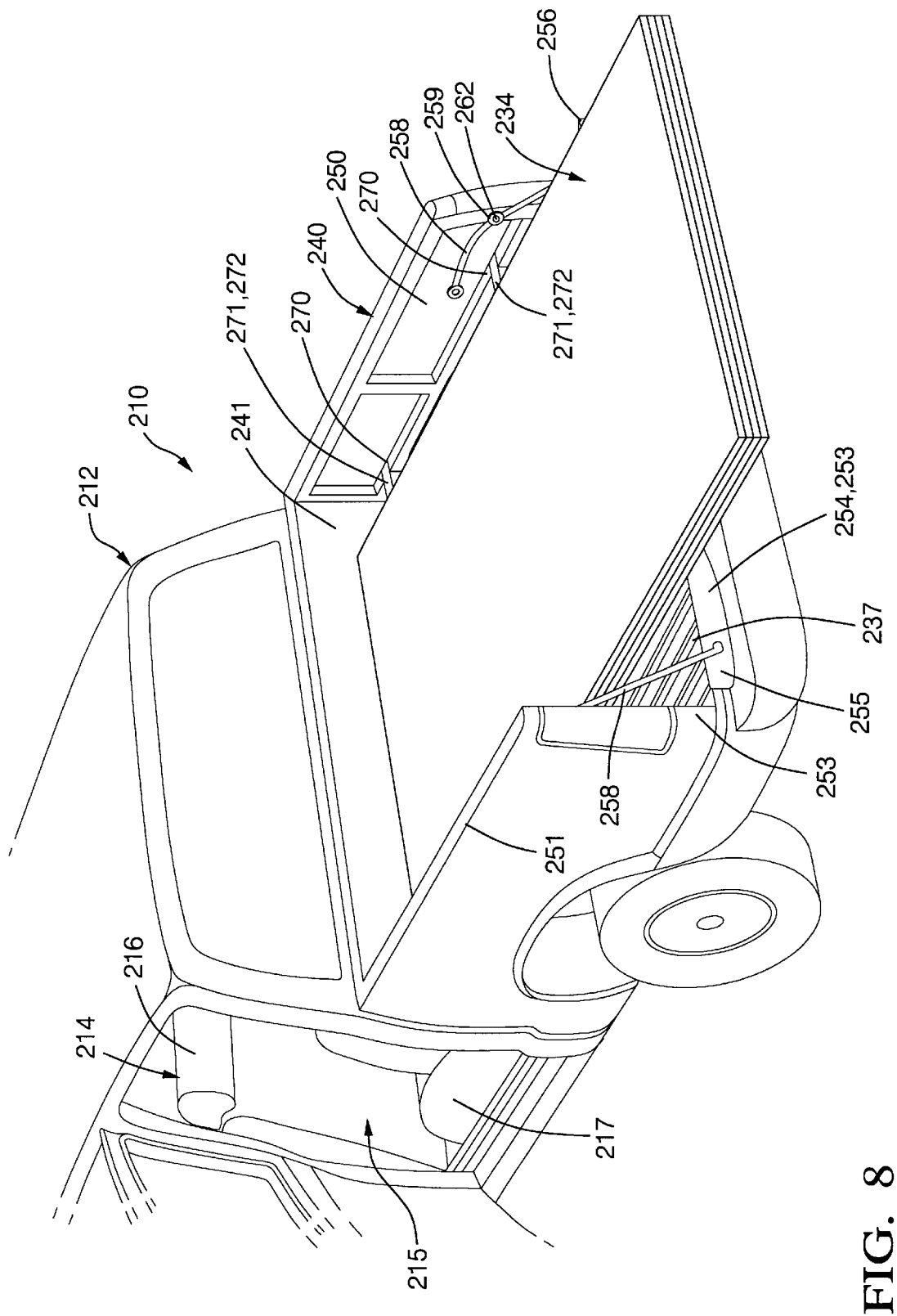
FIG. 8 shows a perspective view of yet a further alternate embodiment of the pick up truck with the tailgate in an intermediate condition for carrying longer loads.
Figure 9:
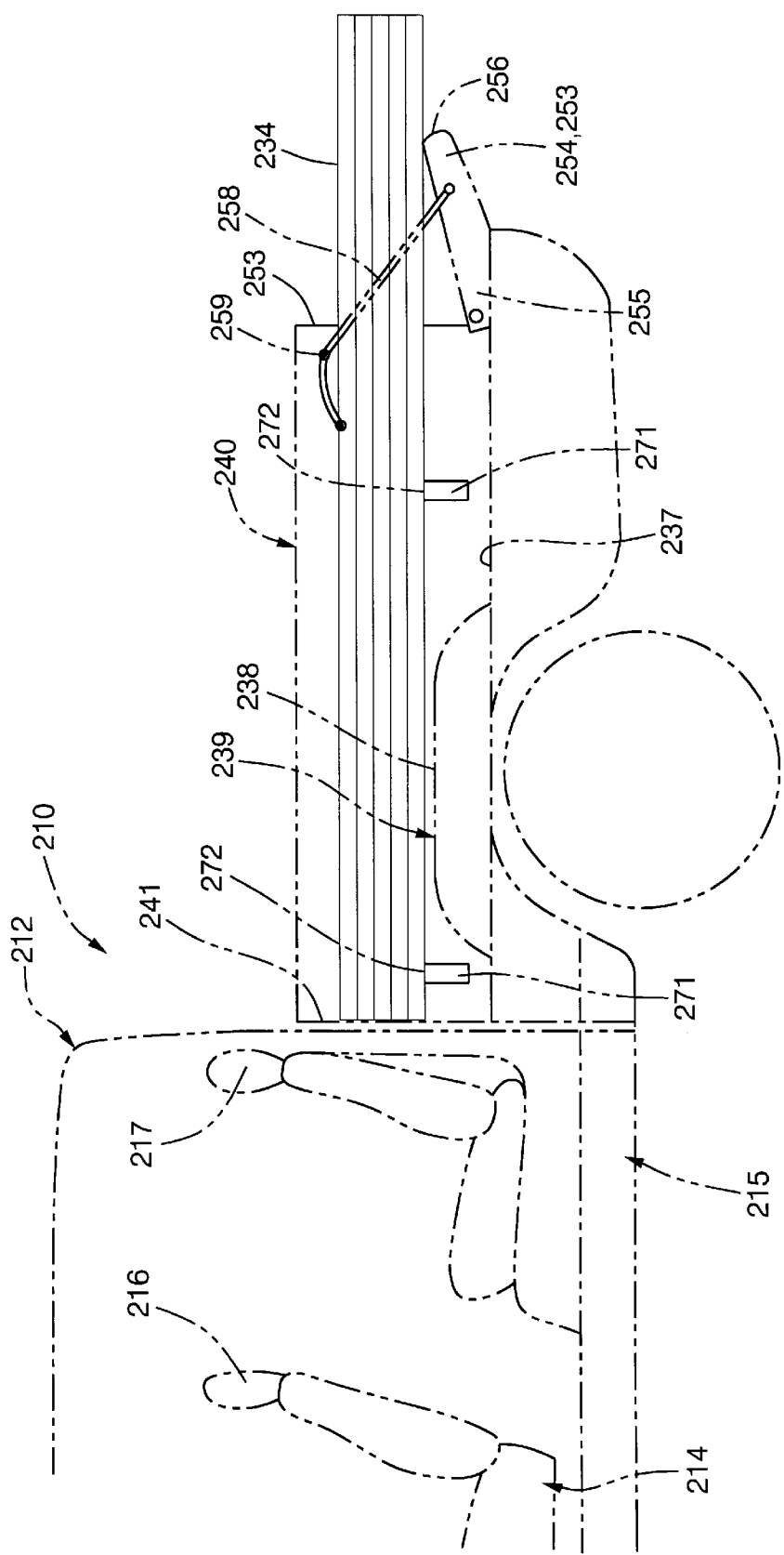
FIG. 9 is a side view showing the embodiment of FIG. 8 with the pickup truck in phantom lines for clarity.

FIGS. 8 and 9 show still another alternate embodiment in which the carrying of a longer load is enabled primarily by reconfiguration of the tailgate 254 to an intermediate position in combination with other second tier loading features, as described below.

A vehicle being a pick up truck 210 includes a cab portion 212 for normally carrying passengers (not shown) and a cargo box 240 for carrying various types of cargo loads 234, for example such as several boards. As best shown in FIG. 9, the truck 210 includes a front passenger seating arrangement 214 having one or more front seats 216 for seating one to three passengers. Preferably, truck 210 also includes a rear extended cab portion 215 which preferably includes one or more rear seats 217 for seating an additional one to three passengers. The truck 210 includes features making it easily adaptable for carrying longer and wider loads without lengthening the cargo box 240 for ease of parking and maneuvering, as described further hereinafter.

The cargo box 240 generally includes four sides comprising a front wall 241, first and second side walls 250, 251 and a rear wall 253 mainly provided by a tailgate 254. The tailgate 254 is pivotally mounted at a lower tailgate edge 255 adjacent to the side walls 250, 251 for normal movement between a fully open condition and a fully closed condition (not shown). The cargo box 240 includes a lower floor portion 237 extending between the walls 241, 250, 251, and 253. The cargo box 240 further includes upwardly extending wheel covers 239 which protrude into the cargo box 240 and decrease the width of the cargo box 240 at the floor portion 237, thus limiting the width of loads which can be carried at the floor level between the wheel covers 239.

As best shown in FIG. 8, the cargo box 240 preferably also includes at least two pairs of vertically extending channels 270. One pair of the channels 270 is preferably positioned between the wheel covers 239 and the tailgate 254 an another pair of channels 270 is preferably positioned between the wheel covers 239 and the front wall 241. The channels 270 may be integrally formed with the sheet metal of the cargo box 240 or may be provided as part of a bedliner (not shown) disposed on the cargo box 240. As best shown in FIGS. 8 and 9, vertically oriented, generally planar support members 271, such as wooden boards, are slidably inserted within the channels 270 and have heights such that top support edges 272 of the support members 271 are generally vertically aligned at or slightly above the upper surfaces 238 of the wheel covers 239. Thus, the support members 271 are used to assist in carrying the cargo load 234 for second tier loading above the wheel covers 239 to utilize the entire width of the cargo box 240. With this arrangement, the cargo load 234 can be loaded above the wheel covers 239 such that the entire width of the cargo box 240 can be utilized.

However, the cargo loads 234 may have a length which exceeds the width of the cargo box 240, especially when the truck 210 includes a shorter cargo box 240 with the rear extended cab portion 215 for additional passenger seating. Advantageously, to accommodate longer loads, the tailgate 254 has an intermediate position in which an upper tailgate edge 256 also supports the load 234 such that the load 234 can extend rearward of the cargo box 240. To accomplish this additional load carrying length, the tailgate 254 is simply folded downward and rearward to the intermediate position and is held in place by adjustable side straps 258 having an intermediate link 259 which is attached to a mating attachment feature 262, such as a knob, on the respective side edges 250, 251 of the cargo box 240 to hold the tailgate 254 in the intermediate position. This strap adjustment can be accomplished manually, simply by detaching any other link on the straps 258 and attaching the intermediate link 259 to the attachment feature 262.

It is important that the upper tailgate edge 256 is vertically aligned with the top support edges 272 of the support members 271 to provide an additional support for carrying the load 234 extending rearward from the cargo box 240 at the elevated second tier preferably at or just above the wheel covers 239 for maximum cargo load width and length capacity.

Advantageously, longer and wider loads can be carried by the pick up truck 210 when configured to the expanded load carrying condition. To achieve the expanded load carrying condition, the support members 271 are vertically slipped into the channels 270 and the tailgate 254 is opened to the intermediate position. The tailgate 254 is held in the intermediate position by attaching the intermediate links 259 on the straps 258 to mating attachment features 262 located on the side walls 250, 251 of the cargo box 240. In this expanded load carrying condition, the truck 210 includes an upper second tier loading above the wheel covers 239 which advantageously enables both a wider load and a longer load 234 to be carried. Also advantageously, this configuration can be easily and quickly achieved by the user of the truck 210 without the use of tools.

It will be appreciated that the load 234 is cooperatively supported intermittently along its length by the top support edges 272 of the support members 271 and the upper tailgate edge 256 of the tailgate 254, all of which are generally vertically aligned with each other to cooperatively provide an intermittent second tier platform, generally designated as 230, for carrying a longer and wider load than possible with the normal cargo box 240. Advantageously, it will be appreciated that the load 234 is able to be carried in a generally flat, horizontal condition while extending out beyond the rear of the cargo box 240.

It will further be appreciated that any means of holding the tailgate 254 in the intermediate position may be utilized and is not limited to the straps 258 shown in FIGS. 8 and 9. Similar to other embodiments previously described having intermediate positions, the tailgate 254 could be held in the intermediate position by straps having numerous additional links, by cables having adjustable keyhole fittings, by chains with adjustable links that snap onto any mating feature on the cargo box 240, or by other adjustable rack and pinion or winching devices which can adjust the tailgate 254 to numerous desired partially open positions, including the intermediate position. It will further be appreciated that additional tie down straps or nets may be provided to keep the load 234 positioned on the intermittent platform 230 during acceleration.

While the present invention has been described as carried out in a specific embodiments thereof, it is not intended to be limited thereby but is intended to cover the invention broadly within the scope and spirit of the appended claims.

What is claimed is:

1. A pick up truck configuration including a cab portion and a cargo box, the cargo box having a front wall adjacent the cab portion and a rear wall, the pick up truck configuration being adaptable for carrying a cargo load longer than the cargo box, the pick up truck configuration comprising:

wheel covers protruding into the cargo box;

a box panel portion pivotally connected to the front wall of the cargo box, the box panel portion being movable between a generally vertical position in which the front wall of the cargo box is closed and a generally horizontal position in which the box panel portion partially overlies and is at least partially supported by the wheel covers, the cargo box including a cargo box opening when the box panel portion is in the generally horizontal position; and a cab panel portion pivotally mounted to the cab portion and being movable between a generally vertical closed position and a generally horizontal open position, the cab portion having a cab opening when the cab panel portion is in the generally horizontal position, the cab opening being at least partially aligned with the cargo box opening;

whereby the pick up truck configuration is adaptable to carry the cargo load longer than the cargo box through both the cab portion and the cargo box.

2. The adaptable pick up truck configuration of claim 1 wherein the rear wall of the cargo box includes a tailgate pivotally connected to the cargo box for movement between a generally upright closed position and a generally horizontal open position, the tailgate having an upper tailgate edge, the tailgate being movable to an intermediate position between the open and closed positions and the upper tailgate edge being vertically aligned with the box panel portion when the tailgate is in the intermediate position and when the box panel portion is in the generally horizontal position such that the pick up truck configuration is adaptable to carry the cargo load in a generally flat horizontal condition supported by the upper tailgate edge and the box panel portion when the cargo load extends rearward past the rear wall of the cargo box.

3. The adaptable pick up truck configuration of claim 1 wherein the cargo box includes side walls and wherein the box panel portion extends substantially between the side walls.

4. The adaptable pick up truck configuration of claim 1 wherein the cab panel portion has a lower cab panel edge about which the cab panel portion pivots open in a forward and downward direction.

5. The adaptable pick up truck configuration of claim 4 wherein cab portion includes a seat adapted to be folded downwardly into a horizontal condition to provide an upwardly facing seat back wall and wherein the cab panel portion at least partially overlies and is supported by the seat back wall when the cab panel portion is in the generally horizontal position.

6. The adaptable pick up truck configuration of claim 1 wherein the cab panel portion has an upper cab panel edge about which the cab panel portion pivots rearward and upward to the generally horizontal position for providing the cab opening.

7. The adaptable pick up truck configuration of claim 1 wherein the cargo box includes opposing channels and a support member adapted to be slipped into the channels and wherein the support member includes a top support edge and wherein the top support edge is generally vertically aligned with the box panel portion when the box panel portion is in the generally horizontal position such that the box panel portion and the top support edge are adapted to cooperatively support the cargo load in a generally horizontal condition.

8. The adaptable pick up truck configuration of claim 1 wherein the cab portion includes a seat adapted to be folded downwardly to a horizontal position to provide an upwardly facing seat load surface and wherein the seat load surface is generally vertically aligned with the box panel portion when the box panel portion is in the generally horizontal position such that the box panel portion and the seat load surface are adapted to cooperatively support the cargo load in a generally horizontal condition.

9. A pick up truck comprising:

a cab having a front seat and a rear seat with a back, the back being pivotable between an upright position and a generally horizontal position, the cab having a closeable cab opening behind the rear seat; and a cargo box having a front wall with a cargo box opening in the front wall at least partially aligned with the cab opening and the cargo box having a support, wherein a cargo load longer than the cargo box is positionable through the cab opening and the cargo box opening and is supported away from a floor portion of the cargo box above the back when in the generally horizontal position and above the support.

\* \* \* \* \*